Patented Feb. 25, 1930

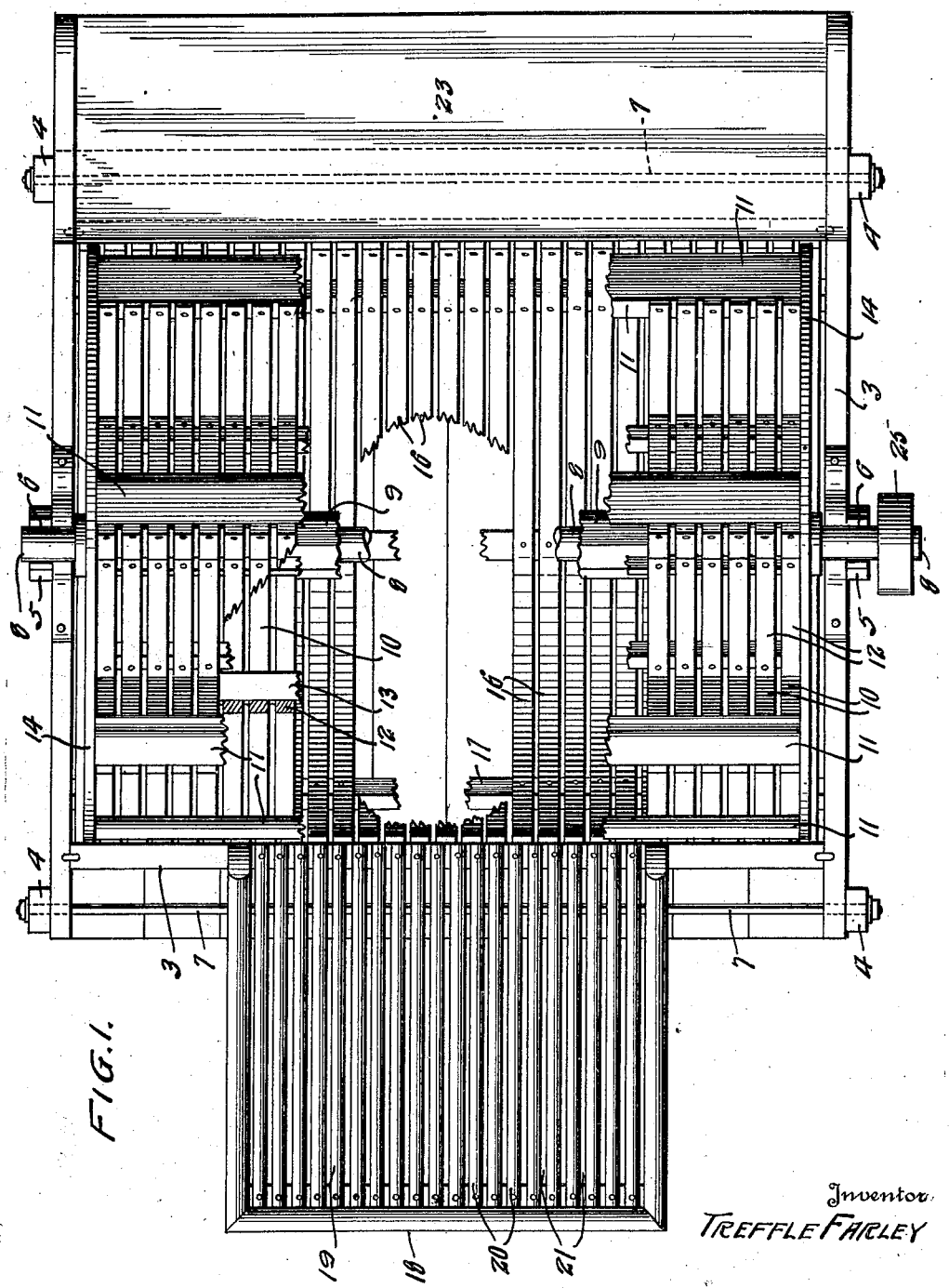

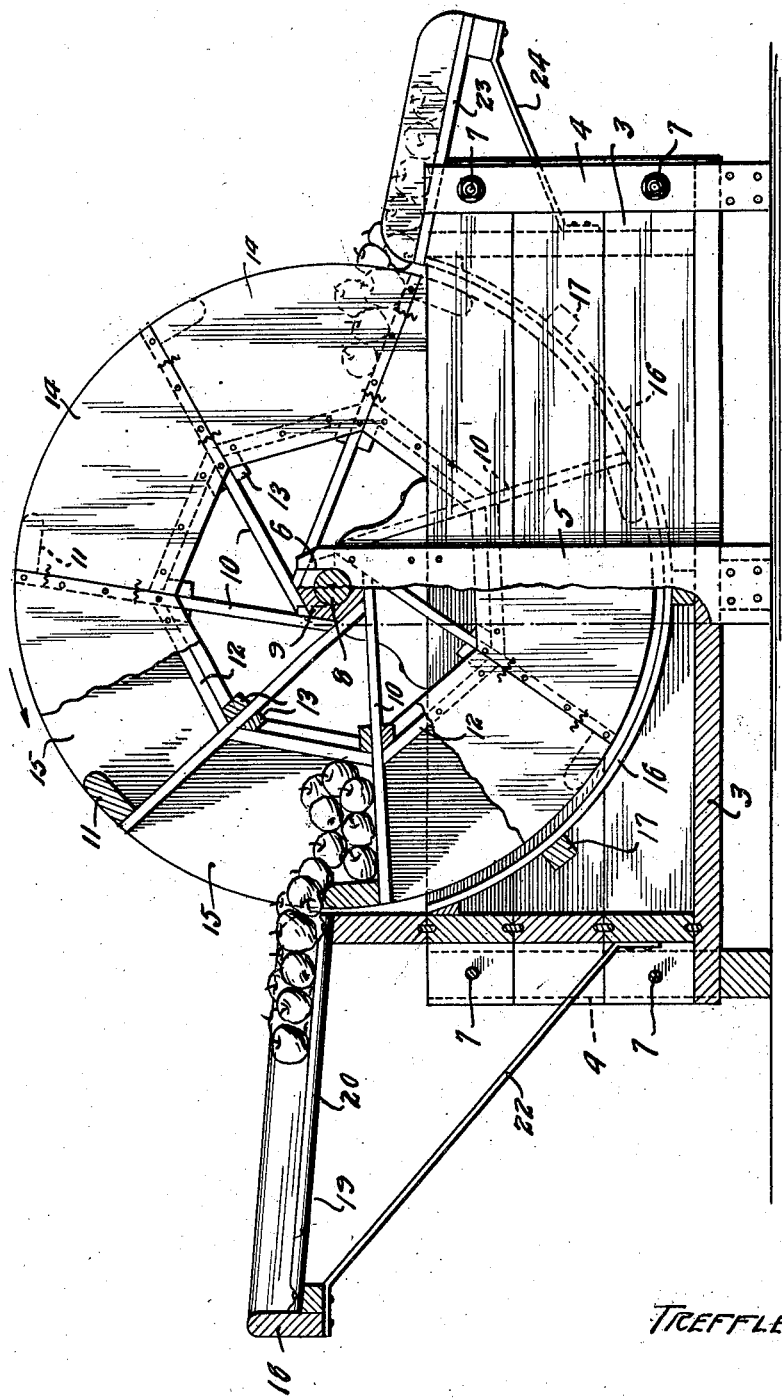

1,748,872

UNITED STATES PATENT OFFICE

TREFFLE FARLEY, OF YAKIMA, WASHINGTON, ASSIGNOR OF THIRTY-THREE AND ONE-THIRD ONE-HUNDREDTHS TO HENRY POULIN AND THIRTY-THREE AND ONE-THIRD ONE-HUNDREDTHS TO WILLIAM McGONAGLE, BOTH OF YAKIMA, WASHINGTON

FRUIT-WASHING MACHINE

Application filed March 9, 1928. Serial No. 260,533.

This invention relates to a machine or apparatus for washing of fruit particularly apples, so as to thoroughly cleanse the same for marketing.

An important object of the invention is to provide a construction which will not bruise or damage the fruit.

Another object of the invention is to provide a simple and inexpensive mechanism which is readily assembled and cleaned and one which is durable and readily portable.

Other objects and advantages of the invention will be apparent from a reading of the following description and claims and as illustrated in the accompanying drawings wherein the same part is designated by the same reference number:

Figure 1 is a plan view of the machine with parts broken away; and,

Fig. 2 is a side elevation, partly in vertical longitudinal section.

Numeral 3 indicates a tank for holding a cleansing fluid (not shown). The tank has braces 4 and a central brace or standard 5 bifurcated at 6.

Tie-rods 7 help to firmly hold the assembly. A shaft 8 passes through hub 9 and to the hub are tangential slats 10. These slats are seven in number forming septagonal divisions.

To the outer or free end of each slot 10 is a transverse retainer or apron 11. Between slats 10 and intermediate the hub 9 and apron 11 are slats or braces 12 positioned by joists 13 attached to slats 10.

Segment side walls 14 are fixed to the sides of the wheel or reel and form pockets 15. The floor or base of each pocket being slotted as shown in Fig. 1, might be called a grate.

In the tank are semi-circular strips 16 concentric with the wheel, said strips being held in place by joists 17.

To feed fruit (apples) into the machine to be washed in the tank 3 a chute 18 is provided having a resilient bottom or trough 19 formed by sections of resilient tubing 20 having spaces 21 between the sections of tubing.

The inlet chute is supported by bracket 22. On the opposite side is an output or discharge chute 23 supported by bracket 24.

The wheel or reel turns as indicated by the arrow in Fig. 2 and is revolved by a pulley or prime mover 25. Force is applied to it to operate the mechanism by a source of power, not shown. This power could be manual or by a gasoline or electric motor or other common form of mechanism.

In constructing tanks it has been found advisable to use copper nails to withstand the acid solutions used in the tank. Clearly the size of the machine depends on its use by the operator. The drawing (Fig. 2) shows the machine to be cleaning apples but obviously the mechanism (perhaps with modifications) could be used to clean other fruits particularly those of a spherical form. In washing some fruits water could be used—in other cases an acid solution, a germicide or insecticide, should be used.

In operation fruit is dumped on the resilient or yielding table or trough 19, 20. The wheel or reel is turned in the direction of the arrow. The fruit is carried into the tank 3 and cleansed. Upon reaching the outlet or discharge chute it passes into packing boxes, etc. (not shown).

It must be understood that only a preferred embodiment of my invention is herein shown and described and that any departure from the same, such as in size, shape or arrangement of parts may be resorted to without departing from the spirit of the invention or the scope of the subjoined claim.

What I claim and desire to secure by Letters Patent in the United States is:

A fruit washing machine comprising a tank having a concave slotted partition positioned above the bottom, a padded inclined delivery chute attached to the tank, a dipping wheel within the tank, said wheel comprising side frames, radial slats positioned between the side frames to form peripheral pockets in the wheel, and a fruit retaining apron at the outer free edge of the pocket to partially close the same, said apron being rounded on its free edge to keep the fruit from bruising.

TREFFLE FARLEY.